US008224378B2

(12) United States Patent
Sun et al.

(10) Patent No.: US 8,224,378 B2
(45) Date of Patent: Jul. 17, 2012

(54) PROTECTING UPLINK TRANSMISSIONS IN COEXISTING WIRELESS NETWORKS

(75) Inventors: Yanjun Sun, Richardson, TX (US); Ariton E. Xhafa, Plano, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 323 days.

(21) Appl. No.: 12/574,904

(22) Filed: Oct. 7, 2009

(65) Prior Publication Data

US 2010/0093392 A1 Apr. 15, 2010

Related U.S. Application Data

(60) Provisional application No. 61/105,652, filed on Oct. 15, 2008.

(51) Int. Cl.
*H04M 1/00* (2006.01)
(52) U.S. Cl. ............... 455/553.1; 455/455; 370/437
(58) Field of Classification Search ............ 455/455, 455/450–451, 452.1–452.2, 453, 501–502, 455/527, 63.1, 41.2–41.3, 452.1–452.2, 41.2–41.3, 455/553.1; 370/437, 447, 448
See application file for complete search history.

(56) References Cited

U.S. PATENT DOCUMENTS

| 7,146,133 | B2 | 12/2006 | Bahl et al. | |
|---|---|---|---|---|
| 7,406,296 | B2 | 7/2008 | Haartsen | |
| 2002/0061031 | A1* | 5/2002 | Sugar et al. | 370/466 |
| 2004/0259589 | A1 | 12/2004 | Bahl et al. | |
| 2005/0058151 | A1 | 3/2005 | Yeh | |
| 2005/0059347 | A1* | 3/2005 | Haartsen | 455/41.2 |
| 2005/0152291 | A1 | 7/2005 | Al-Harthi | |
| 2005/0239497 | A1 | 10/2005 | Bahl et al. | |
| 2006/0020446 | A1 | 1/2006 | Hamby et al. | |
| 2006/0030265 | A1 | 2/2006 | Desai et al. | |
| 2006/0030266 | A1 | 2/2006 | Desai et al. | |
| 2006/0084383 | A1 | 4/2006 | Ibrahim et al. | |
| 2006/0274704 | A1 | 12/2006 | Desai et al. | |
| 2007/0060055 | A1 | 3/2007 | Desai et al. | |
| 2007/0223430 | A1 | 9/2007 | Desai et al. | |
| 2007/0224936 | A1 | 9/2007 | Desai et al. | |
| 2008/0123610 | A1 | 5/2008 | Desai et al. | |
| 2008/0144493 | A1 | 6/2008 | Yeh | |
| 2008/0192806 | A1 | 8/2008 | Wyper et al. | |
| 2008/0207126 | A1 | 8/2008 | Grushkevich et al. | |

FOREIGN PATENT DOCUMENTS

WO 2005020518 A1 3/2005

\* cited by examiner

*Primary Examiner* — Christian Hannon
(74) *Attorney, Agent, or Firm* — Steven A. Shaw; W. James Brady; Frederick J. Telecky, Jr.

(57) ABSTRACT

A system and method for protecting a wireless device including co-located network transceivers from uplink starvation are disclosed herein. A wireless device includes a first wireless transceiver and a second wireless transceiver respectively configured for communication via a first wireless network and a second wireless network. The wireless device further includes logic that determines which of the first and second transceivers is enabled to transmit at a given time. The logic determines a duration of a pending transmission via the first transceiver, and determines a predicted start time of a predicted transmission via the second transceiver. Based on the duration and the predicted start time, the logic transmits a notification signal indicating that a receiving device should refrain from transmitting on the first network for a reserved time ending after the pending transmission starts. The pending transmission starts following completion of the predicted transmission.

5 Claims, 3 Drawing Sheets

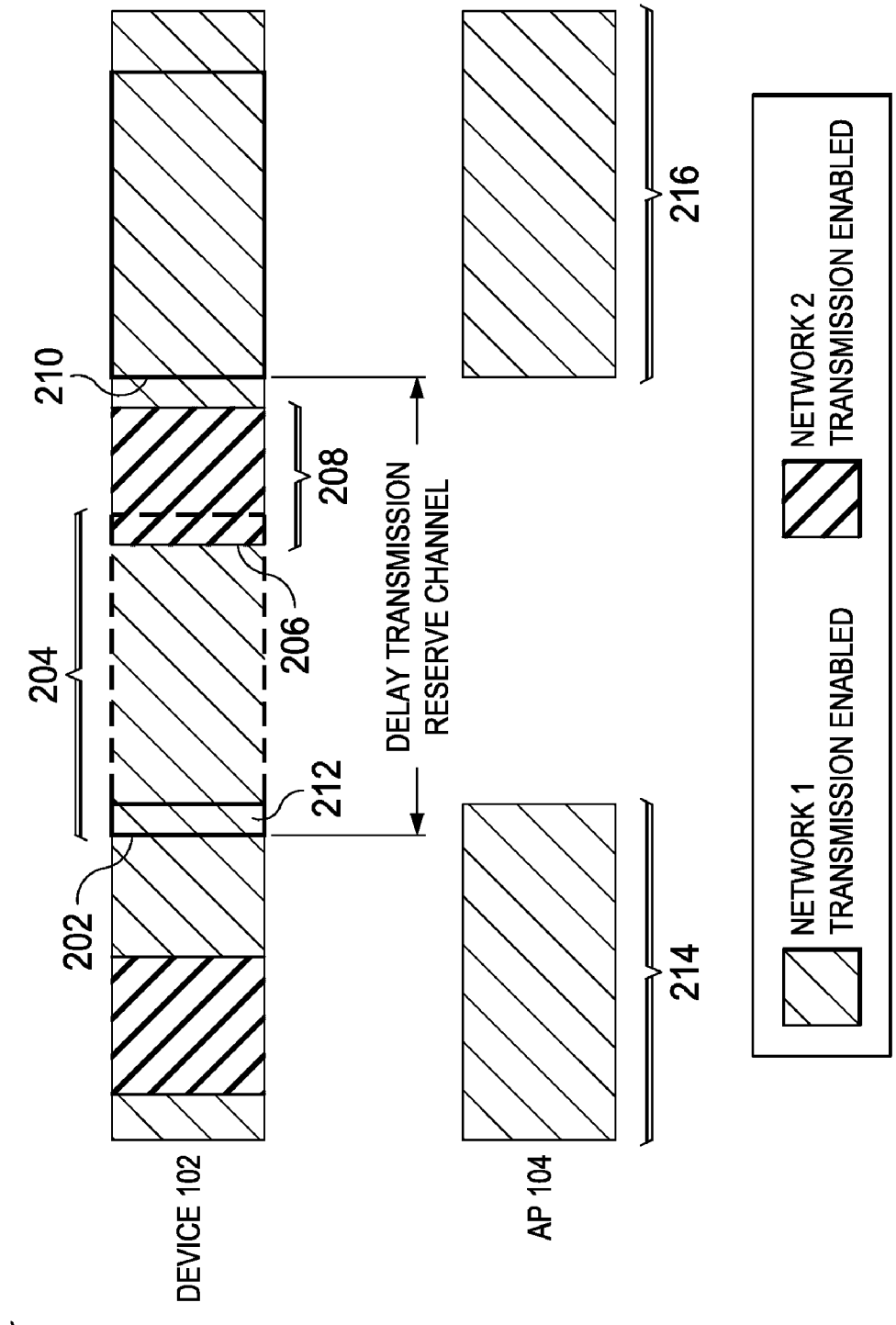

US 8,224,378 B2

PROTECTING UPLINK TRANSMISSIONS IN COEXISTING WIRELESS NETWORKS

CROSS-REFERENCE TO RELATED APPLICATIONS

This application is a non-provisional application claiming priority to provisional application Ser. No. 61/105,652, filed on Oct. 15, 2008, entitled "Protection of Uplink Data Transmission In Coexisting Wireless Networks," the teachings of which are incorporated by reference herein.

BACKGROUND

As wireless technologies proliferate, mobile wireless devices incorporate a multiplicity of different wireless standards. For example, a cellular telephone can accommodate a cellular network (e.g., Universal Mobile Telecommunications System), a wireless local area network ("WLAN"), such as IEEE 802.11, and a wireless personal area network ("WPAN") (e.g., Bluetooth). Including WPAN access makes utilization of a wireless device more convenient by allowing use of wireless headsets and other short-range wireless appliances.

Some of the various wireless standards adopted for use in mobile devices use adjacent and/or overlapping portions of the wireless spectrum. For example, both Bluetooth and IEEE 802.11b/g/n occupy the 2.45 GHz band.

SUMMARY

A system and method for protecting a wireless device including co-located network transceivers from uplink starvation are disclosed herein. A wireless device includes a first wireless transceiver and a second wireless transceiver. The first wireless transceiver is configured for operation with a first wireless network. The second transceiver is configured for operation with a second wireless network. The wireless device further includes logic that determines which of the first and second transceivers is enabled to transmit at a given time. The logic determines a duration of a pending transaction via the first transceiver, and determines a predicted start time of a predicted transaction via the second transceiver. Based on the duration and the predicted start time, the logic transmits a notification signal indicating that a receiving device should refrain from transmitting on the first network for a reserved time ending after the pending transaction starts. The pending transaction starts following completion of the predicted transaction.

In another embodiment, a method includes determining, by a wireless device, a duration of pending transaction via a first wireless network by the wireless device. The wireless device determines a predicted start time of a predicted transaction on a second wireless network by the wireless device. The wireless device transmits a notification signal that causes a receiving device to refrain from transmitting on the first network for a reserved time ending after the pending transaction starts. The transmitting is based on having insufficient time to transmit for the duration prior to the predicted start time. The pending transaction starts after the predicted transaction is complete.

In yet another embodiment, a wireless device includes a first wireless transceiver and a second wireless transceiver. The first transceiver is configured for operation with a first wireless network. The second transceiver is configured for operation with a second wireless network. The wireless device further includes logic that determines which of the first and second transceivers is enabled to transmit at a given time. The logic is configured to select between reserving a time interval for use by the first transceiver and surrendering the time interval for transmissions by other devices on the first network. The selecting is based on whether a pending transaction via the first transceiver can be completed prior to a predicted start time of a predicted transaction via the second transceiver and a comparison of a measure of total prior reserved time to a measure of total prior surrendered time. The logic selects to reserve the time interval for use by the first transceiver based on being unable to complete the pending transaction prior to the predicted start time and a comparison of the measure of total prior surrendered time to the measure of total prior reserved time.

BRIEF DESCRIPTION OF THE DRAWINGS

For a detailed description of exemplary embodiments of the invention, reference will now be made to the accompanying drawings in which:

FIG. 2 shows a diagram of signals transmitted by a wireless device including scheduling to avoid starvation in accordance with various embodiments;

NOTATION AND NOMENCLATURE

Figure 1:
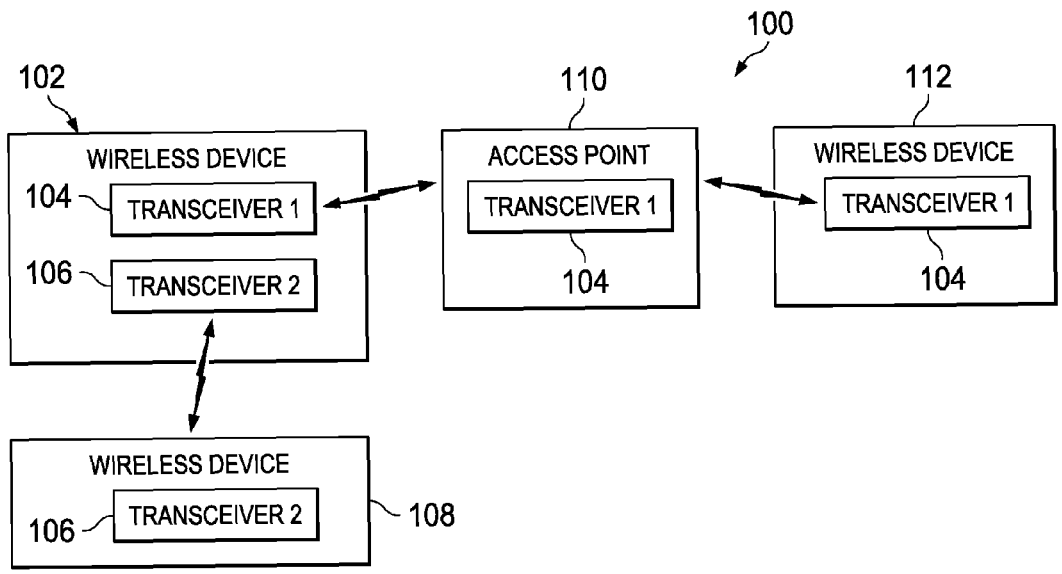
FIG. 1 shows a wireless system including wireless devices that use two interfering wireless networks in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are a system and method for protecting uplink data transmissions in a wireless device including multiple transceivers configured for operation on different and conflicting wireless networks. Mobile wireless devices are sometimes capable of accessing multiple exclusive wireless networks. Such wireless networks can occupy adjacent or overlapping frequency spectrum. For example, Bluetooth and IEEE 802.11b/g/n both utilize the 2.45 GHz band. Access to the networks can be coordinated via time multiplexing to reduce performance degradation caused by collisions that may occur when the networks are simultaneously accessed. In a wireless device configured for operation with co-existing networks, transmission on one network may be given priority over transmissions on another network. For example, transmission of audio data on a first network may require low latency and therefore may be given priority over best effort traffic on another network. Consequently, data transmissions on the second network may be interrupted to allow higher priority transmissions on the first network. The interrupted transmission must thereafter be repeated.

To reduce such retransmission, and the associated waste of bandwidth, a wireless device may choose not to initiate a wireless transaction if the transaction cannot be completed prior to the start of a predicted higher priority transaction on a conflicting network. Other wireless devices will continue to access the wireless network during the interval of forbearance including the higher priority transmission. Consequently, another wireless device may control the channel when the higher priority transaction completes. If such control extends for a long enough interval, the wireless device may again be unable to complete the pending transaction prior to a predicted higher priority transaction. Thus, the wireless device may be severely disadvantaged with regard to channel access, the disadvantage resulting in channel access starvation.

Embodiments of the present disclosure reserve channel access for an interval that allows the wireless device to access the channel after the other network higher priority transmission is complete, thereby preventing starvation. To improve channel utilization, embodiments balance the time during which the channel is reserved with the time during which the channel could be reserved but is surrendered for use by other devices.

FIG. 1 shows an embodiment of a wireless system including wireless devices configured to use two different wireless networks that may interfere with one another when simultaneously accessed. The wireless system 100 includes an access point 110, and wireless devices 102, 108, and 112. The access point 110, and the wireless devices 102, 112 each include a wireless transceiver 104. The wireless transceiver 104 allows the access point 110 and the wireless devices 102, 112 to communicate via a first wireless network, for example, a wireless local area network ("WLAN") (e.g., IEEE 802.11 b/g/n).

The wireless device 108 includes a wireless transceiver 106. The wireless transceiver 106 allows the wireless device 108 to communicate via a second wireless network, for example, a wireless personal area network ("WPAN") (e.g., Bluetooth). The wireless device 102 also includes a second wireless transceiver 106 allowing communication via the second network with the wireless device 108.

While the system 100 is shown with a limited number of wireless devices, in practice, the system 100 may include any number of wireless devices. Exemplary mobile wireless devices 102, 112 include cellular telephones, personal digital assistants, personal computers, navigation devices, personal music players, video gaming systems, etc. Exemplary mobile wireless device 106 may be a wireless headset, wireless earphones, or any other wireless appliance or device.

The access point 110 can also be referred to as a base station, a node B, etc. The access point 110 may connect the wireless devices 102, 112 to a wired network, serve as an intermediary for communication between the wireless devices 102, 112, and/or provide other networking services (e.g., timing services) to the wireless devices 102, 112. Some embodiments of the system 100 can employ ad-hoc networking, and may not include the access point 102. Instead, in such embodiments, the mobile wireless devices 102, 112 can communicate directly with one another.

The first wireless network is incompatible with the second wireless network in that the wireless technologies and/or protocols used by the second network do not allow for wireless communications via the first network. The frequency bands used by the second network can be adjacent to and/or overlap the frequency bands used by the first network. Consequently, operation of the first network can interfere with operation of the second network (and vice versa) by directly interfering with transmissions in overlapping bands or by out-of-band emissions that saturate receivers or interfere with transmissions in adjacent frequency bands. The wireless device 102 time multiplexes access to the communication channel to reduce interference between the co-existing networks. If transactions on one network (e.g., the second network) are considered more time critical than transactions on the other network, then second network transactions may preempt in progress transactions on the first network resulting in inefficient utilization of the first network.

The wireless device 102 schedules transmissions via transceiver 1 104 to avoid conflicts with predictable transmissions via transceiver 2 106. For example, if voice or other audio data are being transmitted via the second network, the transmissions may be scheduled to occur at a regular interval and thus at a predictable time. The wireless device 102 can avoid scheduling transmissions via transceiver 1 104 that will overlap the predictable second network transmissions.

Unfortunately, such scheduling may result in starvation of the wireless device 102 with regard to uplink transmission on the first network when either of the access point 110 or the wireless device 112 control the channel at completion of the second network transmission. Embodiments of the wireless device 112 avoid starvation by transmitting via the first network, a notification signal that reserves channel access for the device 102 until after the second network transmission is complete. In some embodiments, the notification signal may comprise a CTS2SELF signal.

Reserving the channel in this way allows the wireless device 102 to avoid starvation, but also may result in reduced channel utilization because other devices will not access the channel during the period of reservation. To improve channel utilization while avoiding starvation, embodiments of the wireless device 102 also include logic that balances the time for which the channel is reserved with time for which the channel could have been reserved but is instead surrendered for use by other devices.

FIG. 2 shows a diagram of signals transmitted by a wireless device 102 including scheduling to avoid starvation in accordance with various embodiments. In FIG. 2, the wireless device 102 is ready to transmit. At point 202 a packet is available for transmission on the first network via the transceiver 1 104. The transmit duration 204 of the packet is also shown. At point 202, when the packet becomes available for transmission, the wireless device 102 determines whether a predictable transmission via the transceiver 2 106 would interrupt the transmission of the packet if the packet is transmitted prior to the predictable transmission. If a predictable transmission via transceiver 2 106 will interrupt transmission of the packet via transceiver 1 104, then any channel access time reserved for transmission of the packet (i.e., duration 204) will be wasted. Here, the wireless device 102 determines at point 202 that a predictable transmission via transceiver 2, 106 having duration 208 may commence at point 206. If transmission of the available packet on the first network starts before the predictable transmission on the second network, the packet will be interrupted. Consequently, the wireless device 102 may delay transmission of the packet on the first network until time 210 after the completion of the predictable transmission on the second network.

To insure that the wireless device 102 is provided access to the channel at point 210, the wireless device 102 transmits a notification signal 212 at point 202 via the first network. The notification signal specifies a time period during which devices receiving the notification signal may not transmit on the first network. Thus, the wireless device 102 reserves exclusive access to the first network for the time period beginning at the end of the notification signal and ending at point 210 when the pending transmission is initiated. Exclusive access is illustrated in FIG. 2 by the access point 104 (and any other device receiving the notification signal) enabling first network transmission only during unreserved intervals 214, 216.

Figure 3:
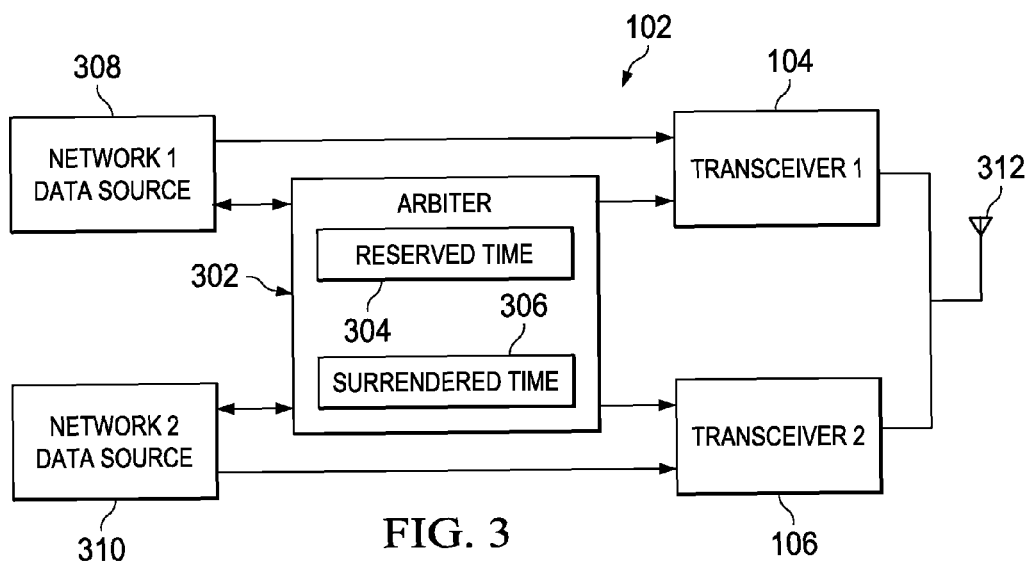
FIG. 3 shows a block diagram of a wireless device configured to operate on two interfering wireless networks and including starvation mitigation in accordance with various embodiments.

FIG. 3 shows a block diagram of a wireless device configured to operate on two interfering wireless networks and including starvation mitigation in accordance with various embodiments. The wireless device 102 includes the transceiver 1 104 configured for communication via the first wireless network and the transceiver 2 106 configured for transmission via the second wireless network. The transceivers 104, 106 are coupled to one or more antennas 312. In some embodiments, the transceivers 104, 106 are coupled to one or more different antennas.

The wireless device 102 also includes an arbiter 302 coupled to the transceivers 104, 106. The arbiter 302 determines which of the transceivers 104, 106 is allowed to access the transmission channel (e.g., allowed to transmit) at a given time, and schedules wireless transactions to optimize utilization of the transmission channel.

The network 1 data source 308 provides data to transceiver 1 104 for transmission on the first network. When data is prepared for transmission, the network 1 data source 308 informs the arbiter 302. The arbiter 302 schedules transmission of the data via transceiver 1 104.

Similarly, the network 2 data source 310 provides data to transceiver 2 106 for transmission on the second network. When data is prepared for transmission, the network 2 data source 310 informs the arbiter 302. The arbiter 302 schedules transmission of the data via transceiver 2 106.

The arbiter 302 schedules transmissions via transceiver 1 104 to avoid uplink starvation and to reduce loss of channel utilization caused by mitigation of uplink starvation. When data is available for communication via the first network, the arbiter 302 determines the duration 204 of a transaction communicating the data. The transaction may include, for example, transmission of packet from the wireless device 102 to the access point 110 and transmission of responsive acknowledgment from the access point 110 to the wireless device 102. Before initiating a transaction via transceiver 1 104, the arbiter determines whether a predictable transmission via transceiver 2 106 will interrupt the transaction. If the arbiter 302 determines that no predictable transmission will interrupt the transaction, then the arbiter 302 may initiate the transaction via transceiver 1 104. One the other hand, if the arbiter 302 determines that a predictable transmission will interrupt the transaction, the arbiter may choose to delay the transaction until the predictable transmission is complete.

If the arbiter 302 chooses to delay the transaction, then the arbiter 302 may transmit via transceiver 1 104, a notification signal 212 that reserves the channel for the exclusive use of the wireless device 102 until after the predictable transmission is complete. That is, wireless devices receiving the notification signal 212 disable transmission on the first network for a time period specified in the notification signal 212. Here, the time period extends until after the predictable transmission is complete. Alternatively, the arbiter 302 may choose not to transmit the notification signal 212. In which case, other wireless devices may use the channel during the transmission delay interval, and wireless device 102 is not guaranteed access to the channel after the predictable transmission is complete.

To provide protection against uplink starvation while reducing channel access time wasted by channel reservation, some embodiments of the arbiter 302 keep track of reserved time 304 and surrendered time 306 and use these values to balance protection of the wireless device 102 with loss of overall channel utilization. Reserved time 304 is a measure of time during which the channel is reserved for exclusive access by the wireless device 102. Surrendered time 306 is a measure of time during which the wireless device 102 could have reserved the channel for a pending transaction but instead surrendered the channel for access by other devices.

In some embodiments, the arbiter 302 may be configured to equalize the reserved time 304 and the surrendered time 306. Thus, if the time the channel has been reserved due to previous transactions is greater than the time the channel has been surrendered in previous transactions, the arbiter 302 may surrender the channel (i.e., not transmit the notification signal 212) for the next relevant transaction.

In some embodiments, the arbiter 302 may reserve the channel if the time surrendered in previous transactions exceeds the time reserved in previous transactions by a predetermined amount. For example, if the surrendered time 304 exceeds the reserved time 304 by 100 milliseconds, the arbiter 302 may reserve the channel for future transactions until the difference between the surrendered time 306 and the reserved time 304 is less than a predetermined amount (e.g., zero).

In some embodiments of the arbiter 302, the reserved time 304 and the surrendered time 306 are represented in counters, for example, a single counter. The counter may be incremented each time the channel is surrendered and decremented each time the channel is reserved or vice versa. If the counter reaches a predetermined threshold value, the arbiter 302 will thereafter reserve the channel as needed until the counter reaches a predetermined minimum value (e.g., zero). In some embodiments, the counter is incremented by two each time the channel is surrendered and decremented by one each time the channel is reserved.

Various components of the wireless device 104, including at least some portions of the transceivers 112, 114, and the arbiter 302, can be implemented using a processor and software programming that causes the processor to perform the operations described herein. In particular, software programming can be used to cause a processor to determine transaction duration, determine whether predictable transmissions are imminent, schedule notification signal transmission, and maintain measurements of reserved time and surrendered time. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming can be stored in a computer readable medium. Exemplary computer readable media include semiconductor memory, optical storage, and magnetic storage.

Some embodiments can implement the functionality described herein using dedicated circuitry. Some embodiments may use a combination of dedicated circuitry and software executed on a processor. Selection of a hardware or software/processor implementation of embodiments is a design choice based on a variety of factors, such as cost and the ability to incorporate changed or additional functionality in the future.

Figure 4:
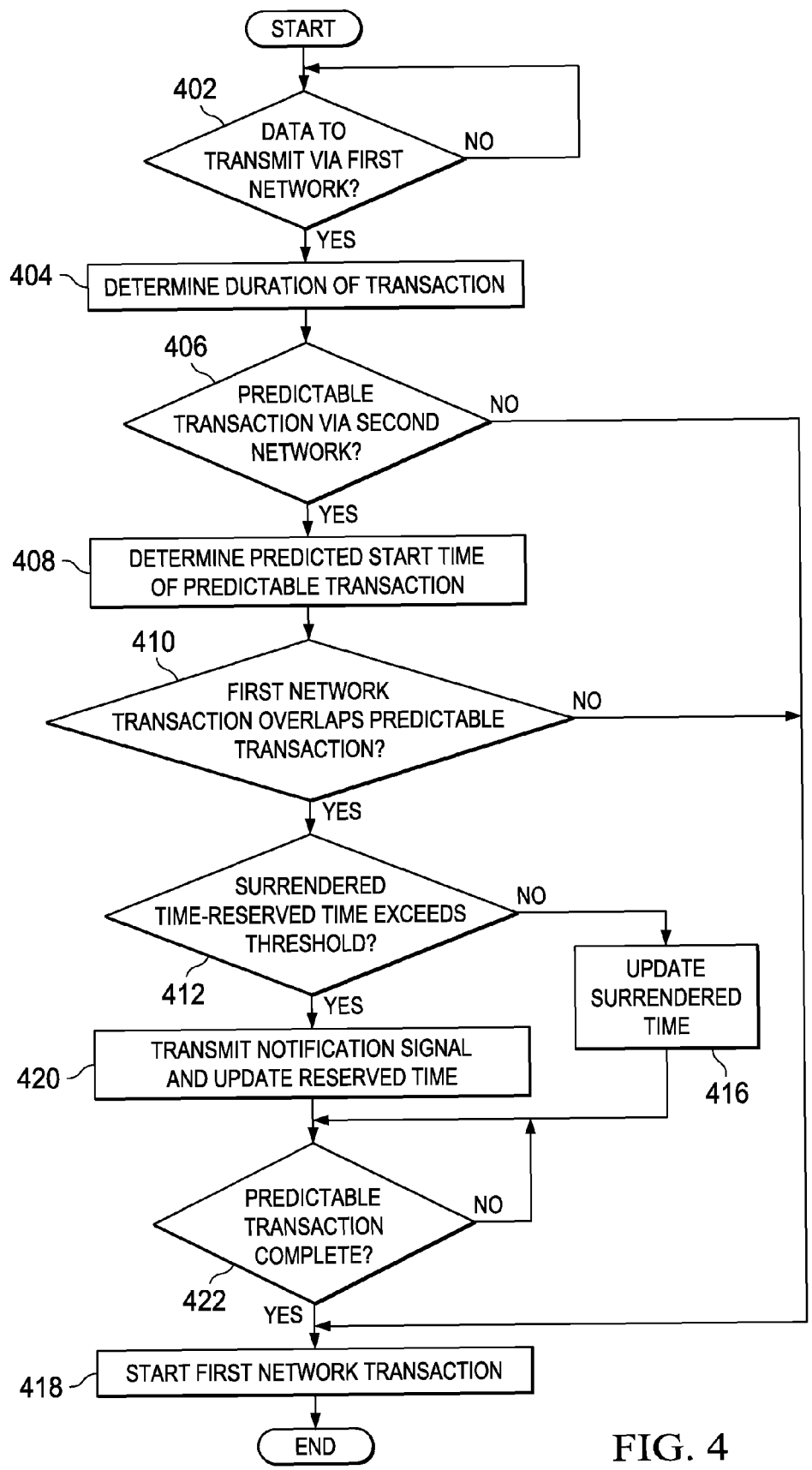
FIG. 4 shows a flow diagram for a method for preventing starvation in a wireless device configured to operate on interfering wireless networks in accordance with various embodiments.

FIG. 4 shows a flow diagram for a method for preventing starvation in a wireless device configured to operate on interfering wireless networks in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 4, as well as other operations described herein, can be implemented as instructions stored in a computer readable medium and executed by a processor.

In block 402, a wireless device 102 including co-located network transceivers 104, 106 each configured for operation on different and incompatible wireless networks is configured to wirelessly communicate by time multiplexed operation of the transceivers 104, 106. The device 102 checks for transactions to be performed (e.g., data to be transmitted) via the transceiver 104 on the first network. If a transaction via the first network is to be performed, then, in block 404, the arbiter 302 determines the duration of the transaction. A transaction may include transmission of data and reception of acknowledgement.

In block 406, the wireless device 102 determines whether a transaction using the second network can be predicted. If a transaction using the second network cannot be predicted, then the arbiter 302 starts the first network transaction in block 418. If a transaction using the second network can be predicted, then, in block 408, the arbiter 302 determines a predicted start time of the predictable second network transaction.

In block 410, the arbiter 302 determines whether the pending first network transaction will overlap the predictable second network transaction. The overlap determination is based on the duration of the first network transaction and the predicted start time of the predictable transaction. If the arbiter 302 determines that the transactions will not overlap, then, then the arbiter 302 starts the first network transaction in block 418.

If the arbiter 302 determines that the transactions will overlap, then, in block 412, the arbiter 302 determines whether channel time should be reserved to insure access to the channel, or channel access time should be surrendered for use by other devices. The arbiter 302 may determine, for example, whether the difference between previously surrendered time and previously reserved time exceeds a predetermined threshold. If the arbiter 302 determines that channel time should be surrendered for use by other devices, then, in block 416, the arbiter 302 updates the measure of surrendered time 306 to include the newly surrendered time interval (e.g., end of predictable transaction less current time). The arbiter 302 waits for the predictable transaction to complete in block 422, and starts the first network transaction in block 418.

If the arbiter 302 determines that the wireless device should be protected from uplink starvation by reserving channel time for use by the wireless device 102, then, in block 420, the arbiter 302 transmits a notification signal 212 to the other devices (e.g., 110, 112) using the first network. The notification signal 212 causes receiving devices to refrain from accessing the first network until a time after the predictable transmission is complete and the wireless device 102 has initiated the pending first network transaction (e.g., point 210). The arbiter 302 updates the measure of reserved time 304 to include the newly reserved time interval (e.g., time point 210 less time point 202). The arbiter 302 waits for the predictable transaction to complete in block 422, and starts the first network transaction in block 418.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
 a first wireless transceiver and a second wireless transceiver, the first transceiver configured for operation with a first wireless network, and the second transceiver configured for operation with a second wireless network; and
 logic that determines which of the first and second transceivers is enabled to transmit at a given time;
 wherein the logic is configured to select between reserving a time interval for use by the first transceiver and surrendering the time interval for transmissions by other devices on the first network, the selecting based on whether a pending transaction via the first transceiver can be completed prior to a predicted start time of a predicted transaction via the second transceiver and a comparison of a measure of total prior reserved time to a measure of total prior surrendered time; and
 wherein the logic selects to reserve the time interval for use by the first transceiver based on being unable to complete the pending transmission prior to the predicted start time and a comparison of the measure of total prior surrendered time to the measure of total prior reserved time.

2. The wireless device of claim 1, wherein the logic transmits, via the first transceiver, a notification signal indicating that a receiving device should refrain from transmitting on the first network for a reserved time, the reserved time ending after the wireless device commences the pending transaction via the first transceiver, the commencing being after completion of the predicted transaction.

3. The wireless device of claim 1, wherein the logic is configured to balance time reserved for use by the first transceiver and time surrendered for use by other wireless devices on the first network.

4. The wireless device of claim 1, wherein the logic selects to reserve the time interval based on the measure of total prior surrendered time exceeding the measure of total prior reserved time by a predetermined amount.

5. The wireless device of claim 1, wherein the measure of total prior surrendered times comprises a count of a number of times a channel has been surrendered for use by other devices, and the measure of total prior reserved time comprises a count of number of times the channel has been reserved for use by the first transceiver.

* * * * *